US006523664B2

(12) United States Patent
Shaw et al.

(10) Patent No.: US 6,523,664 B2
(45) Date of Patent: Feb. 25, 2003

(54) ROLLERS AND TRACK FOR GRAVITY FED SHELVING APPARATUS

(75) Inventors: Kenneth A. Shaw, Wayne, IL (US); Edward I. Knorring, Jr., Wheaton, IL (US); Henry Massett, Evergreen Park, IL (US); Joseph Coretti, Jr., Wheaton, IL (US); Charles Nicholas, Plainfield, IL (US)

(73) Assignee: B-O-F Corporation, Aurora, IL (US)

( * ) Notice: Subject to any disclaimer, the term of this patent is extended or adjusted under 35 U.S.C. 154(b) by 0 days.

(21) Appl. No.: 09/915,957

(22) Filed: Jul. 25, 2001

(65) Prior Publication Data

US 2003/0019714 A1 Jan. 30, 2003

(51) Int. Cl.[7] ............................................ B65G 13/00
(52) U.S. Cl. ........................ 193/35 R; 198/780; 193/37
(58) Field of Search ................................ 193/35 R, 37; 198/780

(56) References Cited

U.S. PATENT DOCUMENTS

| | | | | |
|---|---|---|---|---|
| 2,099,222 A | * | 11/1937 | Paxton | 15/3.17 |
| 2,593,089 A | * | 4/1952 | Barry | 193/35 R |
| 2,594,295 A | * | 4/1952 | Cushman | 193/35 R |
| 2,801,730 A | * | 8/1957 | Strickler | 193/35 R |
| 3,420,348 A | * | 1/1969 | Caudell | 193/35 R |
| 3,586,142 A | * | 6/1971 | Inwood et al. | 193/35 R |
| 3,726,376 A | * | 4/1973 | Gotham et al. | 193/35 R |
| 3,890,755 A | * | 6/1975 | Specht | 193/35 R |
| 4,054,195 A | * | 10/1977 | Wahl | 193/35 R |
| 4,056,180 A | * | 11/1977 | Gunti | 193/35 J |
| 4,366,894 A | * | 1/1983 | Huelster | 193/35 R |
| 4,681,215 A | * | 7/1987 | Martin | 193/37 |
| 4,718,154 A | | 1/1988 | Bauer et al. | |
| 5,048,661 A | | 9/1991 | Toye | |
| 5,207,313 A | * | 5/1993 | Gebhardt | 198/780 |
| 5,415,272 A | * | 5/1995 | Boschert et al. | 193/35 R |
| 5,788,090 A | | 8/1998 | Kajiwara | |
| 5,951,228 A | | 9/1999 | Pfeiffer et al. | |
| 6,016,900 A | | 1/2000 | Longrod | |
| 6,089,385 A | | 7/2000 | Nozawa | |
| 6,112,875 A | * | 9/2000 | Gibson | 193/35 R |
| 6,132,158 A | | 10/2000 | Pfeiffer et al. | |
| 6,158,574 A | * | 12/2000 | Williams et al. | 198/780 |
| 6,286,660 B1 | * | 9/2001 | Kalm | 193/35 R |
| 6,431,808 B1 | * | 8/2002 | Lowrey et al. | 193/35 R |

FOREIGN PATENT DOCUMENTS

| | | | | |
|---|---|---|---|---|
| CA | 715877 | * | 8/1965 | 193/35 R |
| CH | 302656 | | 1/1955 | |

OTHER PUBLICATIONS

"Cut Your Labor Costs in Half with the Anthony Model 4500 VOLUMEMASTER™ Gravity Flow Racks", brochure published by Anthony Manufacturing Company, n.a, n.d.

"Gravity Flow Shelving Systems/Nyla–Rol™ Catalog", brochure published by B–0–F Corporation, 1994.

* cited by examiner

*Primary Examiner*—Christopher P. Ellis
*Assistant Examiner*—Richards Ridley
(74) *Attorney, Agent, or Firm*—Marshall, Gerstein & Borun

(57) ABSTRACT

A gravity feed roller track and method of manufacturing same are disclosed. The roller track includes a roller tray in which a plurality of rollers are frictionally held. The tray includes a bottom wall from which first and second side supports normally extend. Each of the side supports is substantially z-shaped in vertical cross-section. More specifically, each of the side shapes includes upper and lower vertical sections laterally spaced by an angled extension wall. A plurality of recesses are provided in the extension walls and lower vertical support wall for receipt of hubs of each of the rollers. The tracks allow for smooth rolling and dispensing of product from the roller track, accommodate a range of product sizes, and enable a single size roller to be used with tracks of various width.

27 Claims, 3 Drawing Sheets

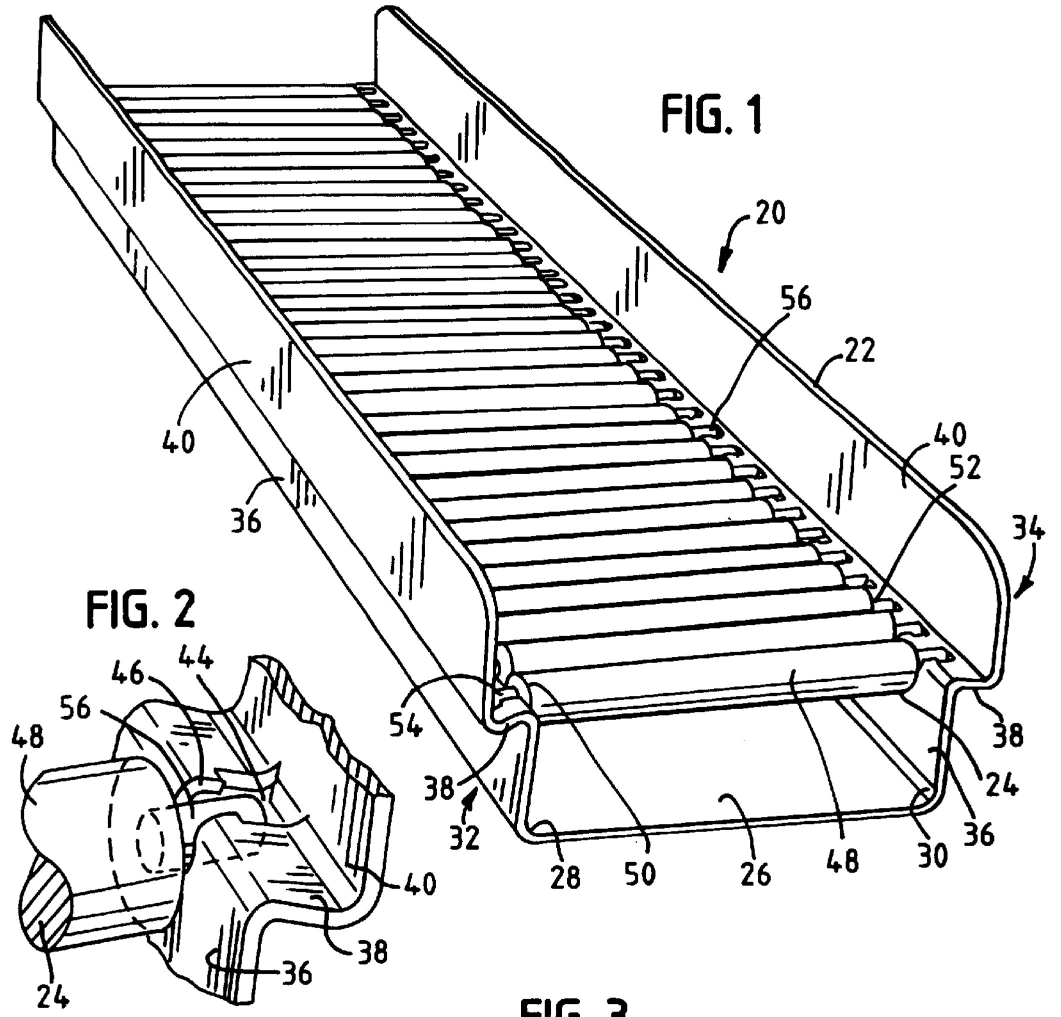
FIG. 1
FIG. 2
FIG. 3
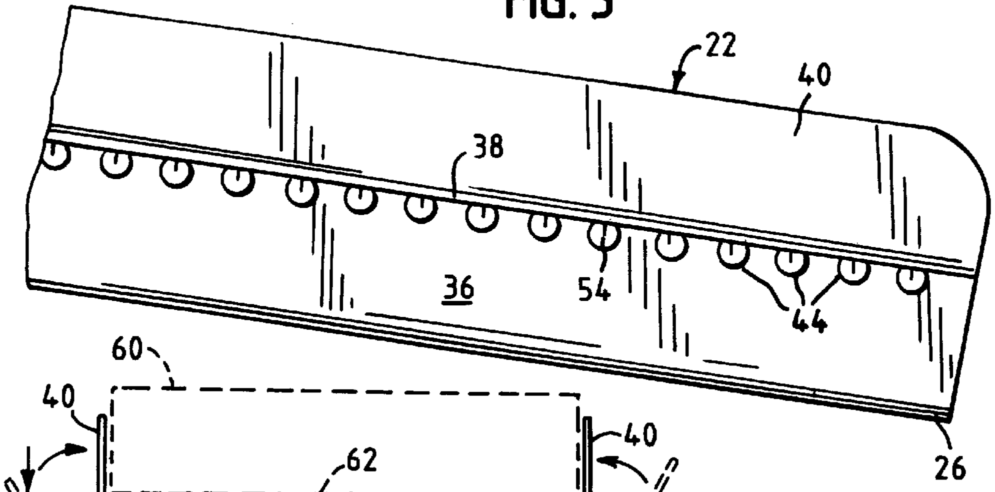
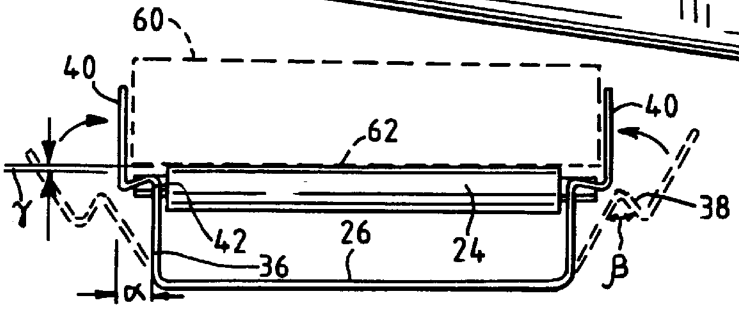
FIG. 4

FIG. 5
FIG. 6
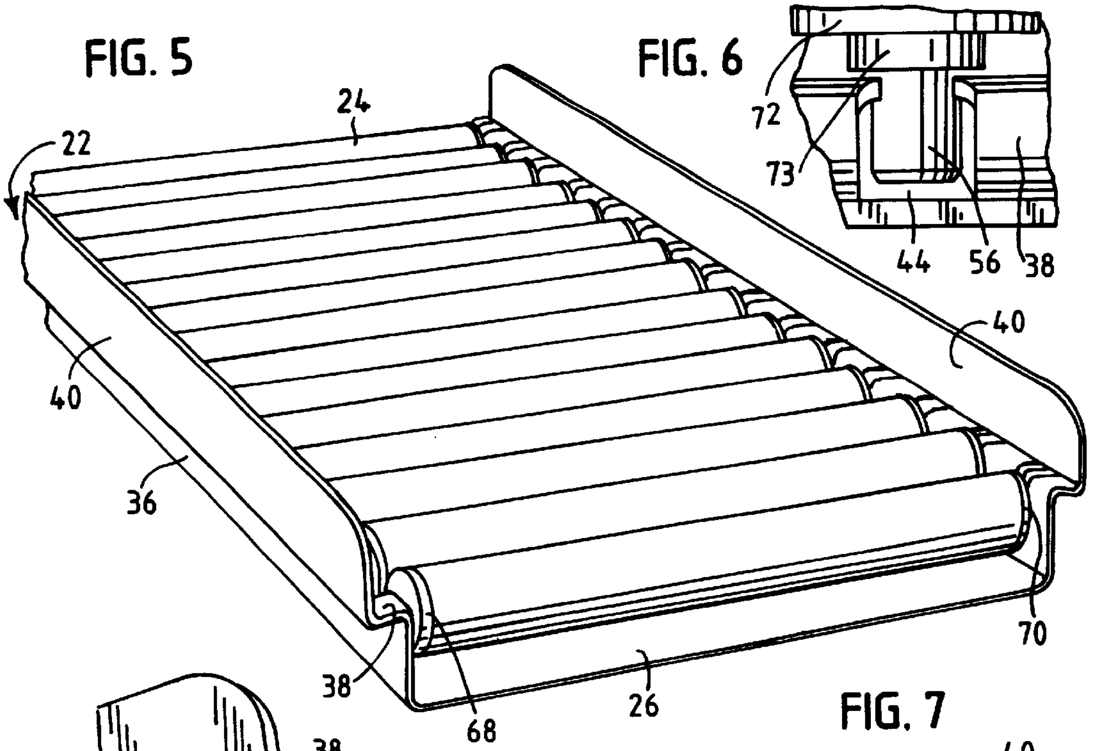
FIG. 8
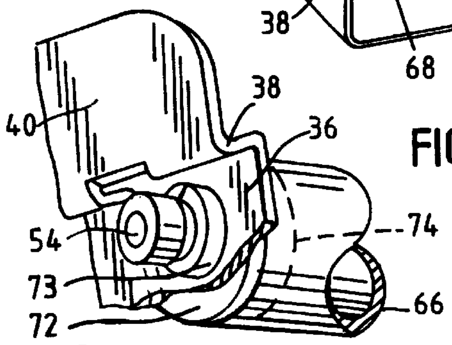
FIG. 7
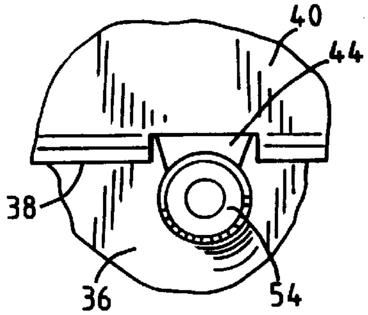
FIG. 9
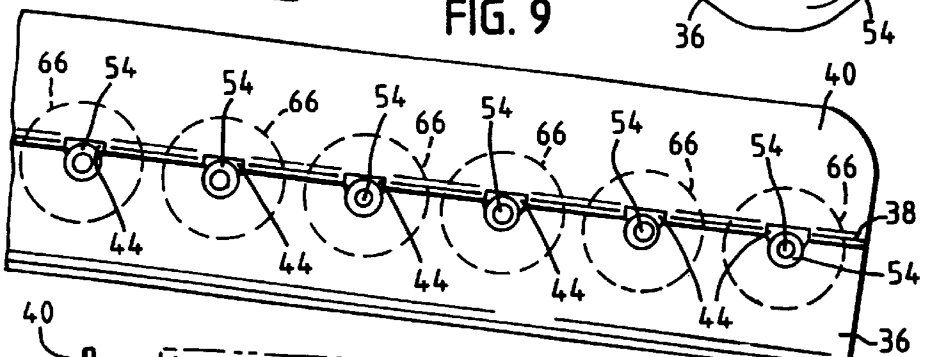
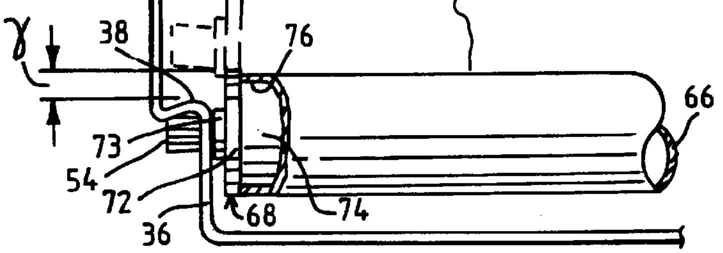
FIG. 10

ROLLERS AND TRACK FOR GRAVITY FED SHELVING APPARATUS

FIELD OF THE INVENTION

This invention relates to gravity fed shelving for product conveyance, such as at the retail level and, more particularly, to improved rollers and tracks therefor.

BACKGROUND OF THE INVENTION

Roller-type gravity fed shelving is typified by the roller-type commodity stand of U.S. Pat. No. 6,089,385, and the Conveyor of U.S. Pat. No. 5,048,661. Additionally, there are also the "Volume Master" (Trademark) gravity flow tracks made by Anthony Manufacturing Company, Inc., of San Fernando, Calif. Finally, the assignee of the present application also has long made its NylaRol® gravity flow shelving. Particularly, rollers transversely mounted at spaced locations along one or more track members, and with their uppermost height stationed at a point above the tracks, are used to roll-convey product along the track. In a gravity-fed alignment situation, the rear of the track is higher than the front or dispensing end, and product is fed by gravity and rolls to the frontmost available position along the track.

Because of the various products needing conveyance, e.g. half gallon milk containers on the one hand versus soft drink cans and cartons of half and half cream on the other hand, product widths vary greatly. When used in retail sales settings, e.g. convenient stores, it is imperative that such gravity fed roller tracks operate smoothly, continuously feed the product to the front without a product "hangup" on any portion along the track, and can be easily installed and cleaned. However, various problems are found with the prior art gravity fed roller products. For example, separate track members are often required for each unit; the units are difficult to clean when there has been spillage (e.g., milk leaking from a container); the roller hubs often extend beyond the outer limits of the exterior track walls, thereby causing restriction to roller spin in many cases; the use of large-diameter rollers inherently creates a larger than desirable, center-to-center distances between roller axes; neither the rollers nor the tracks can be removed from the angled shelf without disassembly, i.e. creating expensive and time consuming cleanings and adjustments; and different width products require different sized rollers and tracks. Regarding the latter, when the prior larger-diameter rollers are utilized, smaller product containers, e.g. quart containers and square half gallon containers, often ride rough, and even hangup during gravity feeding, due to the larger center-to-center distance between rollers.

SUMMARY OF THE INVENTION

The z-tray of the present invention is easily formed from a stamped flat metal sheet, and then formed up to create the unique z-shape, whereby the hubs of the unit-length mini rollers are rotatably supported in the side walls of the z-tray, while the upper (or "rolling engagement") surface of each roller is maintained at a height above the supporting side walls of the z-tray. Once formed, the z-tray is a one piece, completely removable and easily cleanable rigid conveyor roller track, without any separate track members being required. The present z-tray design permits a minimum of clearance between adjacent product conveyance lanes. Since the roller hubs do not extend beyond the outside limits of the exterior vertical walls of a given z-tray, there is no chance for roller spin restriction, as is common in the prior art. The small center-to-center dimensions available through the use of the present small diameter unit rollers, permits successful transport of very small product packages, i.e., less than 3" in depth.

The glass filled injectable plastic material preferably used for molding the present mini rollers enable each roller to be molded without distortion, and the glass fill assists in increasing the strength and hardness of each roller. To create optimal rolling ability, and thereby reduce friction, a preferred axial diameter-to-roller diameter ratio is utilized for the present mini roller part.

The present invention overcomes the problems in the prior art by providing a specially configured "z-tray" for use with small-diameter rollers, preferably formed as injection molded and glass-filled members. To accommodate larger product width, as compared to small product width, the same length, small-diameter roller of the present invention can be utilized, but simply with a z-tray that has been formed with wider outside retaining walls, still leaving the rollers high. That is, whether a given z-tray is for a large product or a small product, its roller support structure is formed to retain the same size mini roller, and the outside retaining walls are then closer or farther apart depending on the conveyed product's width. Further, larger diameter prior art-style rollers, such as the standard aluminum tube with nylon hub-type roller commonly used, can be retrofitted into the present invention's z-type tray to create an improved gravity fed roller track having lift out and easy cleaning capability.

BRIEF DESCRIPTION OF THE DRAWINGS

The foregoing advantages and benefits of the present invention are joined with accompanying drawings, of which:

FIG. 1 is a perspective view of a gravity flow roller track constructed in accordance with the teachings of the invention;

FIG. 2 is an enlarged fragmented view of a roller and roller hub mounted within a recess of the roller track of FIG. 1;

FIG. 3 is a fragmented side view of the roller track of FIG. 1;

FIG. 4 is an end view of the roller track of FIG. 1 with side walls of the roller track being formed shown in phantom;

FIG. 5 is a perspective view of an alternative embodiment of a roller track constructed in accordance with the teachings of the invention;

FIG. 6 is a fragmentary top view of a roller and roller hub mounted in a recess of the roller track of FIG. 5

FIG. 7 is a fragmentary side view of the roller track of FIG. 5;

FIG. 8 is a cut-away perspective view of an end roller of FIG. 5;

FIG. 9 is a fragmentary side view of the roller track of FIG. 5;

FIG. 10 is a fragmentary end view of the roller track of FIG. 5, with a roller being inserted into the back being shown in phantom lines.

Figure 11:
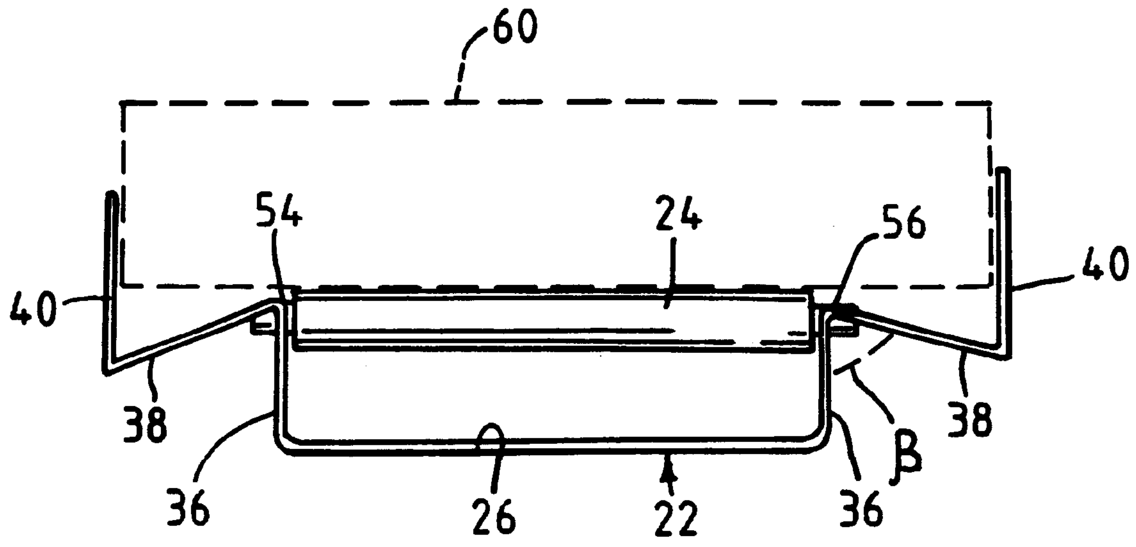
FIG. 11 is a perspective view of a second alternative embodiment of a roller track constructed in accordance with the teachings of the invention.

While the invention is susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Referring now to the drawings, and with specific reference to FIG. 1, a roller track constructed in accordance with the teachings of the invention is generally referred to by reference numeral 20. While the track 20 is generally depicted as a gravity feed roller track, meaning that the track is angled so as to allow gravity to pull products forward to a dispensing position, it is to be understood that the teachings of the invention can be employed for construction of other types of roller conveyors including horizontal conveyors. Moreover, while the roller track 20 depicted will be described below primarily for use in conjunction with product movement within refrigerated display cases of convenient stores, refrigerators, and the like, or boxed bulk food shelving at warehouse food stores, it is to be understood that such conveyors can be employed in other situations requiring product conveyance as well.

As shown in FIG. 1, the roller track 20 includes a roller frame or tray 22 within which are mounted a plurality of rollers 24. In each of the depicted embodiments, the roller tray 22 includes a bottom wall 26 which is substantially planar in shape, and which includes first and second side edges 28, 30 from which first and second side supports 32 and 34, respectively, extend vertically upwardly or normal to the bottom wall 26.

As shown best in FIG. 4, each of the side supports 32, 34 includes a lower vertical support wall 36, an intermediate extension wall 38 and an upper guide wall 40. The lower and upper walls 36, 40 are substantially parallel and offset by a distance a equal to the width of the extension wall 38.

Again as shown best in FIG. 4, the extension wall 38 extends outwardly and downwardly from an upper edge 42 of each lower support wall 36. The angle at which the extension wall 38 extends from the lower support wall 36, referred to in FIG. 4 as reference character β, is preferably an acute angle within the range of about 45° to about 85°, and more preferably about 75°, the importance of which will be discussed in further detail herein.

Turning now to FIGS. 2 and 3, the roller tray 22 is shown to include a plurality of spaced recesses 44 for receipt of the rollers 24. Each of the recesses 44 is formed in the extension wall 38 and lower support wall 36 of one of the first and second side supports 32, 34. As shown best in FIG. 3, the shape of the recess within the lower support wall 36 may be substantially circular while, as shown in FIG. 2, the shape of the recess formed within the extension wall 38 may be substantially rectangular. Each of the recesses 44 may further include a retention nib 46 or pair of retention nibs 46 to decrease the width of the recess 44 sufficiently so as to frictionally engage and retain the rollers 24, while allowing the rollers 24 to rotate freely.

With respect to each of the rollers 24, the embodiment depicted in FIGS. 1–4 shows each to be of a unit length and made of a unitary piece of material, preferably injection molded plastic with a glass fill. One preferred material is a 6/6 Nylon with 30–35% glass beads available from Arbon Corporation, under part no. 124-0-B. Such a material provides adequate strength and hardness in the roller while enabling the roller to be molded within strict tolerances and with minimized distortion or other deformation. Each of the rollers 24 preferably includes a central cylinder 48 having first and second ends 50, 52, from which hubs 54 and 56 extend, respectively. In a preferred embodiment of the roller 24, each of the central cylinders 48 includes a diameter of approximately 0.25–0.75 and a length of approximately 1.5 to 5.5. More preferably, each cylinder has a diameter of about 0.3125 and a length of about 2.5. Of course, the roller 24 can be manufactured to alternative dimensions, but the inventors have found that such dimensions are preferable to ensure free flow of product through the roller track 20 by allowing sufficient top clearance of the roller cylinders 24 over the extension walls 38, yet also have sufficiently small center-to-center 20 dimensions. Accordingly, a roller diameter to roller length ratio of approximately 0.09 to 0.12 is preferable, although rollers of alternative ratios are certainly possible and encompassed within the scope of the present invention.

In addition to such dimensions, it is preferable to closely space the rollers 24. Doing so increases the surface area or area of contact between the product being conveyed by the roller track and the cylindrical cylinders 48, thereby reducing the load on each roller 24 and facilitating movement and preventing product hang ups during conveyance. The inventors have found that, using rollers of the above dimension, a center-to-center spacing is preferably within the range of about 0.25 to 0.75 and more preferably approximately 0.375". Of course, in alternative embodiments, wherein rollers of larger dimension are used for example, spacings of larger dimension would be employed.

Referring now to FIG. 4, it will be noted that a top edge 58 of each cylindrical cylinder 48 extends above the upper edge 42 of the lower support wall 36 by a distance y. One benefit of such positioning is that a product 60 (as shown in phantom lines in FIG. 4) can roll upon the central cylinders 48 of each roller 24 with adequate clearance between a bottom surface 62 of each product 60 and the extension wall 38. In concert with such clearance, the guide walls 40 ensure lateral positioning of the product 60. Accordingly, not only does the product 60 remain correctly positioned on the roller track 20, but the product 60 also freely moves along the roller track 20 when positioned at a sufficient incline, such as that shown in FIG. 3, to ensure gravity feed of the product 60.

Turning now to FIGS. 5–10, an alternative embodiment of a roller track constructed in accordance with the teachings of the invention is again generally referred to by reference numeral 20. Wherein like elements are employed in the alternative embodiment, like reference numerals are used in the following description. One difference with respect to the alternative embodiment of FIGS. 5–10, is with respect to the rollers 24. Each of the rollers 24 includes a central cylinder 48, first and second ends 50 and 52, and first and second hubs 54 and 56 as with the first embodiment.

However, the rollers 24 of the alternative embodiment are not of a unitary construction. Rather, each roller includes a hollow cylindrical sleeve 66 (preferably formed of metal, e.g. aluminum) with stub axles 68 and 70 (preferably formed of injection-molded plastic) inserted into hollow ends 50, 52. As shown best in FIG. 10, each of the stub axles 68, 70 includes an end plate 72 from which a spacer 73 and a hub 54, 56 laterally extend. Opposite the spacer 66 and hub 56, a retention cylinder 74 laterally extends inwardly. The retention cylinder 74 may be sized so as to frictionally engage an inner circumferential surface 76 of the metal sleeve 66, or may include a plurality of retention wedges or other structures to provide sufficient frictional interference between the retention cylinders 74 and the metallic sleeve

64. Such rollers are commonly available, as through the assignee. It can therefore be seen that the teachings of the invention enable conventional rollers to be retrofitted into the z-shaped roller trays 22, thereby reducing cost, alleviating inventory, and facilitating use.

Turning now to FIG. 11, a still further embodiment of a roller track 20 constructed in accordance with the teachings of the invention is illustrated. The second alternative embodiment is constructed identically to that of the embodiment of FIGS. 1–4, but as will be noted, the extension walls 38 are of a substantially greater dimension. Each of the rollers 24 are of the same length and diameter as that of the first embodiment, but the extension walls 38 are elongated so as to increase the distance $\Delta$, between the guide walls 40. Accordingly, where the product 60 to be conveyed is of a substantially greater width, it can be accommodated on the roller track 20 of the second alternative embodiment.

For example, whereas the roller track 20 of the first embodiment (FIGS. 1–4) may be sized to accommodate quart size milk cartons in a convenience store refrigerator (having generally a three inch width dimension), the roller track 20 of the second alternative embodiment may be sized to accommodate half gallon cartons, or perhaps even full gallon jugs (the latter having generally a six inch width dimension). The guide walls 40 are sufficiently spaced to accommodate such sizes, and the rollers 24 provide sufficient surface area for smooth movement of the product 60 through the roller track without any hangup or jerky movement. The angle $\beta$ between the extension walls 38 and the lower support walls 36 and clearance $\gamma$ between the product 60 and the lower support wall 36 are sufficient so as to avoid any interference between the extension walls 38 and the product 60.

In manufacturing roller tracks 20 according to the teachings of the invention, a first step is to fabricate a blank (not shown) cut to the dimensions of the desired conveyor. This may be performed by, for example, die cutting or stamping metal, such as aluminum. Preferably, the blank is stamped with recesses 44 therein.

As shown best in FIG. 4, a next step is to form the blank into the zshaped tray 22. This may be performed, for example, by folding the ends of blank into the desired z-shaped configuration and then folding the sides 32, 34 upwardly as indicated in phantom lines in FIG. 4.

Once the tray 22 is so formed, the roller track 20 can be completed by inserting the rollers 24 into opposite pairs of recesses 44. As indicated in phantom lines in FIG. 10, this can be achieved by snapping a first hub 56 of each roller 24 into a suitable recess 44, and then downwardly depressing the opposite hub 54 of the same roller 24 into frictional engagement with an opposite recess 44. The roller 24 is thereby rotatably retained and journalled in the tray 22 with the track 20 being completed when each of the recesses 44 is filled with rollers 24 as depicted in FIGS. 1 and 5.

From the foregoing, it will be appreciated that the teachings of the invention can be used to construct a gravity feed roller track with substantially improved operation.

What is claimed is:

1. A gravity flow roller track for transporting product containers, comprising:

a roller tray having a bottom wall and first and second side supports, each side support having a support wall, an extension wall, and a guide wall, each support wall extending substantially normal to the bottom wall, each extension wall extending downwardly and outwardly from a top edge of one of the supports walls, each guide wall extending substantially normal from an outside edge of one of the extension walls, each support wall including a plurality of spaced recesses; and a plurality of rollers having first and second ends, the first and second ends being mounted in the plurality of recesses.

2. The gravity flow roller track of claim 1, wherein each of the side supports is substantially z-shaped in vertical cross-section.

3. The gravity flow roller track of claim 1, wherein the roller tray is manufactured from a unitary piece of material.

4. The gravity flow roller track of claim 3, wherein the unitary piece of material is stamped metal.

5. The gravity flow roller track of claim 1, wherein each of the plurality of rollers is manufactured from glass filled injection molded nylon.

6. The gravity flow roller track of claim 1, wherein each of the plurality of rollers includes first and second end hubs, and wherein the spaced recesses are slightly smaller in diameter than the end hubs, the hubs being frictionally held within the spaced recesses.

7. The gravity flow roller track of claim 1, wherein each of the rollers includes an outer cylindrical surface which extends above the extension walls.

8. The gravity flow roller track of claim 1, wherein the bottom wall is substantially planar.

9. The gravity flow roller track of claim 1, wherein each of the plurality of rollers include first and second end hubs, the guide walls being outside of the first and second end hubs.

10. The gravity flow roller track of claim 1, wherein each extension wall extends from one of the support walls at an acute angle.

11. The gravity flow roller track of claim 1, wherein each of the rollers includes a length and a diameter $\beta$, the ratio of $\beta$ to being within the range of substantially about 0.09 to substantially about 0.12.

12. The gravity flow roller track of claim 11, wherien each of the rollers is adapted for use with roller trays having extension walls of variable width.

13. The gravity flow roller track of claim 1, wherein each of the rollers includes a hollow cylindrical sleeve with hub inserts in first and second ends of the sleeve.

14. The gravity flow roller track of claim 13, wherein the sleeve is metallic and the hub inserts are plastic.

15. The gravity flow roller track of claim 13, wherein the sleeve and hub inserts are plastic.

16. The gravity flow roller track of claim 1, wherein the plurality of rollers each have lengths ranging from about 1.5 inches to about 5.5 inches.

17. The gravity flow roller track of claim 1, wherein the plurality of rollers are 2.5 inches in length.

18. The gravity flow roller track of claim 1, wherein the plurality of rollers each have a diameter ranging from 0.25 inches to 0.75 inches.

19. The gravity flow roller track of claim 1, wherein the plurality of rollers have a diameter of 0.3125 inches.

20. The gravity flow roller track of claim 1, wherein the plurality of rollers are separated by a center-to-center distance, the center-to-center distance being within the range of about 0.25 inches to about 0.75 inches.

21. The gravity flow roller track of claim 20, wherein the center-to-center distance is 0.375 inches.

22. The gravity flow roller track of claim 1, wherein each extension wall extends downwardly and away from one of the support walls at an angle within the range of about 45 degrees to about 85 degrees.

23. The gravity flow roller track of claim 22, wherein the angle is 75 degrees.

24. A gravity flow roller track for transporting product containers thereon, comprising:

a roller tray member having a bottom wall, a pair of vertical roller support walls with one each extending from respective ends of the bottom wall, a pair of angled extension walls with one each extending outwardly from an upper end of one of the roller support walls, and a pair of vertical guard walls with one each extending upwardly from an outer end of one of the respective angled extension walls;

a series of spaced roller hub retention slots formed in each of the upper ends of the roller support walls and associated edges of the angled extension wall; and a plurality of roller members mounted within the series of spaced roller hub retention slots.

25. The gravity flow roller track of claim 24, wherein each roller member is manufactured from a unitary piece of material.

26. The gravity flow roller track of claim 25, wherein the material is nylon with a glass fill.

27. The gravity flow roller track of claim 24, wherein each roller member includes a hollow cylindrical shell with first and second end inserts.

* * * * *

UNITED STATES PATENT AND TRADEMARK OFFICE

CERTIFICATE OF CORRECTION

PATENT NO. : 6,523,664 B2
DATED : February 25, 2003
INVENTOR(S) : Shaw et al.

It is certified that error appears in the above-identified patent and that said Letters Patent is hereby corrected as shown below:

Column 6,
Lines 37-38, please replace "length and a diameter $\beta$, the ratio of $\beta$ to being" with -- length $\alpha$ and a diameter $\beta$, the ratio of $\beta$ to $\alpha$ being --.

Signed and Sealed this

Seventh Day of October, 2003

JAMES E. ROGAN
*Director of the United States Patent and Trademark Office*